(12) United States Patent
Sun

(10) Patent No.: US 8,800,951 B2
(45) Date of Patent: Aug. 12, 2014

(54) MOUNTING DEVICE FOR FAN

(75) Inventor: Zheng-Heng Sun, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 236 days.

(21) Appl. No.: 13/525,390

(22) Filed: Jun. 18, 2012

(65) Prior Publication Data

US 2013/0320183 A1    Dec. 5, 2013

(30) Foreign Application Priority Data

Jun. 5, 2012 (CN) .......................... 2012 1 0181912

(51) Int. Cl.
*F16M 13/00* (2006.01)

(52) U.S. Cl.
USPC ...... 248/628; 248/615; 248/200; 248/346.01; 415/213.1; 361/697

(58) Field of Classification Search
USPC ........ 248/628, 674, 617–619, 675, 678, 27.3, 248/200, 201, 346.01, 637, 638, 510; 361/697, 704, 707, 709, 710, 685, 694, 361/695; 403/220; 415/213.1; 165/80.3, 165/121, 122; 257/721, 727
See application file for complete search history.

(56) References Cited

U.S. PATENT DOCUMENTS

| | | | | |
|---|---|---|---|---|
| 4,834,615 A * | 5/1989 | Mauch et al. | ............ | 415/213.1 |
| 4,888,637 A * | 12/1989 | Sway-Tin et al. | ............ | 174/252 |
| 5,509,465 A * | 4/1996 | Lai | ............... | 165/80.3 |
| 5,960,862 A * | 10/1999 | Hu | .............. | 165/80.3 |
| 5,969,941 A * | 10/1999 | Cho | ........ | 361/679.48 |
| 5,991,152 A * | 11/1999 | Chiou | ............ | 361/704 |
| 6,193,205 B1 * | 2/2001 | Wang | ............ | 248/510 |
| 6,239,974 B1 * | 5/2001 | Tseng | ............ | 361/704 |
| 6,392,885 B1 * | 5/2002 | Lee et al. | ............ | 361/697 |
| 6,404,633 B1 * | 6/2002 | Hsu | ............ | 361/703 |
| 6,407,919 B1 * | 6/2002 | Chou | ............ | 361/697 |
| 6,434,004 B1 * | 8/2002 | Matteson | ............ | 361/704 |
| 6,592,327 B2 * | 7/2003 | Chen et al. | .......... | 415/213.1 |
| 6,654,246 B2 * | 11/2003 | Wu | ............ | 361/697 |
| 6,992,889 B1 * | 1/2006 | Kashiwagi et al. | ........ | 361/700 |
| 7,245,488 B2 * | 7/2007 | Chen | ............ | 361/695 |
| 7,289,324 B2 * | 10/2007 | Yu | ............ | 361/697 |
| 7,304,843 B2 * | 12/2007 | Peng et al. | ........ | 361/679.48 |
| 7,365,975 B2 * | 4/2008 | Xia et al. | ............ | 361/695 |
| 7,379,300 B1 * | 5/2008 | Chen | ............ | 361/695 |
| 7,385,814 B1 * | 6/2008 | Chen | ............ | 361/695 |
| 7,408,774 B1 * | 8/2008 | Anderl et al. | ............ | 361/695 |
| 7,545,641 B2 * | 6/2009 | Chen | ............ | 361/695 |
| 7,583,498 B2 * | 9/2009 | Chen et al. | ........ | 361/679.48 |
| 7,599,179 B2 * | 10/2009 | Chen et al. | ........ | 361/679.48 |
| 7,618,309 B2 * | 11/2009 | Liang | ............ | 454/184 |
| 7,748,955 B2 * | 7/2010 | Lee | ............ | 415/119 |
| 8,047,780 B2 * | 11/2011 | Chen et al. | .......... | 415/213.1 |

(Continued)

*Primary Examiner* — Terrell McKinnon
*Assistant Examiner* — Monica Millner
(74) *Attorney, Agent, or Firm* — Novak Druce Connolly Bove + Quigg LLP

(57) ABSTRACT

A mounting device for mounting a fan includes a base board and two blocks to be mounted on opposite sides of a bottom of the fan. The base board forms two rods. Each block defines a fixing hole in which a corresponding rod engages. A resilient member is mounted to a bottom of each block for absorbing vibrations of the fan. The resilient member includes an arc-shaped main piece, and two fixing pieces respectively extending from opposite ends of the main piece to be mounted to opposite ends of the corresponding block, respectively.

16 Claims, 5 Drawing Sheets

(56) References Cited

U.S. PATENT DOCUMENTS

| | | | |
|---|---|---|---|
| 8,075,248 B2* | 12/2011 | Yin et al. | 415/60 |
| 8,206,103 B2* | 6/2012 | Sun | 415/213.1 |
| 8,267,369 B2* | 9/2012 | Ling | 248/689 |
| 8,373,989 B2* | 2/2013 | Gong et al. | 361/695 |
| 8,613,588 B2* | 12/2013 | Chen | 415/119 |
| 2004/0000398 A1* | 1/2004 | Lee et al. | 165/185 |
| 2007/0053160 A1* | 3/2007 | Chen | 361/695 |
| 2008/0014093 A1* | 1/2008 | Fan et al. | 416/244 R |
| 2008/0253886 A1* | 10/2008 | Chen | 415/213.1 |
| 2009/0135552 A1* | 5/2009 | Tu et al. | 361/676 |
| 2009/0288803 A1* | 11/2009 | Chen et al. | 165/80.2 |
| 2012/0328449 A1* | 12/2012 | Xia et al. | 416/244 R |
| 2013/0216374 A1* | 8/2013 | Sun | 415/213.1 |
| 2013/0256499 A1* | 10/2013 | Sun | 248/674 |
| 2013/0256500 A1* | 10/2013 | Sun | 248/674 |
| 2013/0256502 A1* | 10/2013 | Sun | 248/675 |
| 2013/0259675 A1* | 10/2013 | Sun | 415/213.1 |
| 2013/0259676 A1* | 10/2013 | Sun | 415/213.1 |
| 2013/0272867 A1* | 10/2013 | Sun | 415/213.1 |
| 2013/0272868 A1* | 10/2013 | Sun | 415/213.1 |

* cited by examiner

MOUNTING DEVICE FOR FAN

CROSS-REFERENCE TO RELATED APPLICATIONS

Relevant subject matter is disclosed in two pending U.S. patent applications, both titled "MOUNTING DEVICE FOR FAN", respectively filed on Apr. 19, 2012, with the application Ser. No. 13/450,505, and filed on May 17, 2012, with the application Ser. No. 13/473,631, which are assigned to the same assignee as this patent application.

BACKGROUND

1. Technical Field

The present disclosure relates to a device for mounting a fan.

2. Description of Related Art

Many electronic devices use fans to cool internal components. The fans may be mounted to a rack by a plurality of screws, and then are mounted in an electronic device together with the rack, which adds to the cost of the rack.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
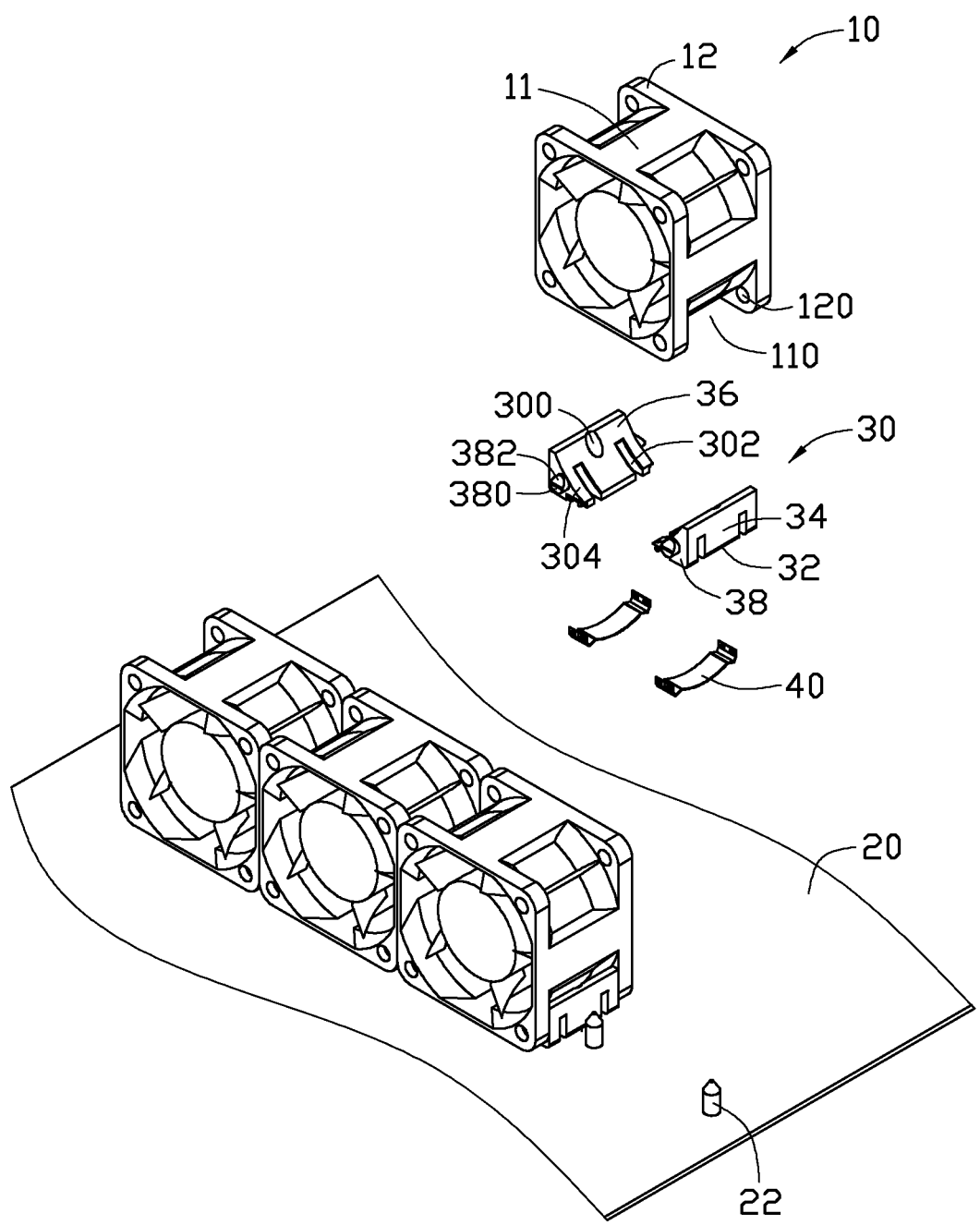
FIG. 1 is an exploded, isometric view of an exemplary embodiment of a mounting device together with a plurality of fans, wherein the mounting device includes a plurality of resilient members, and a plurality of blocks.

Referring to FIG. 1, an exemplary embodiment of a mounting device for fixing a plurality of fans 10 is provided. The mounting device includes a base board 20 of an electronic device (not shown), a plurality of resilient members 40, and a plurality of blocks 30.

Each fan 10 includes a hollow and substantially rectangular main body 11 and two spaced boards 12 connected to opposite ends of the main body 11. The main body 11 defines a depressed portion 110 in each of two lower sides. Each depressed portion 110 has a curved bottom wall. Each board 12 defines two corner holes 120 in a lower portion of the board 12.

The base board 20 forms a plurality of rods 22. Each rod 22 has a tapered distal end.

Figure 2:
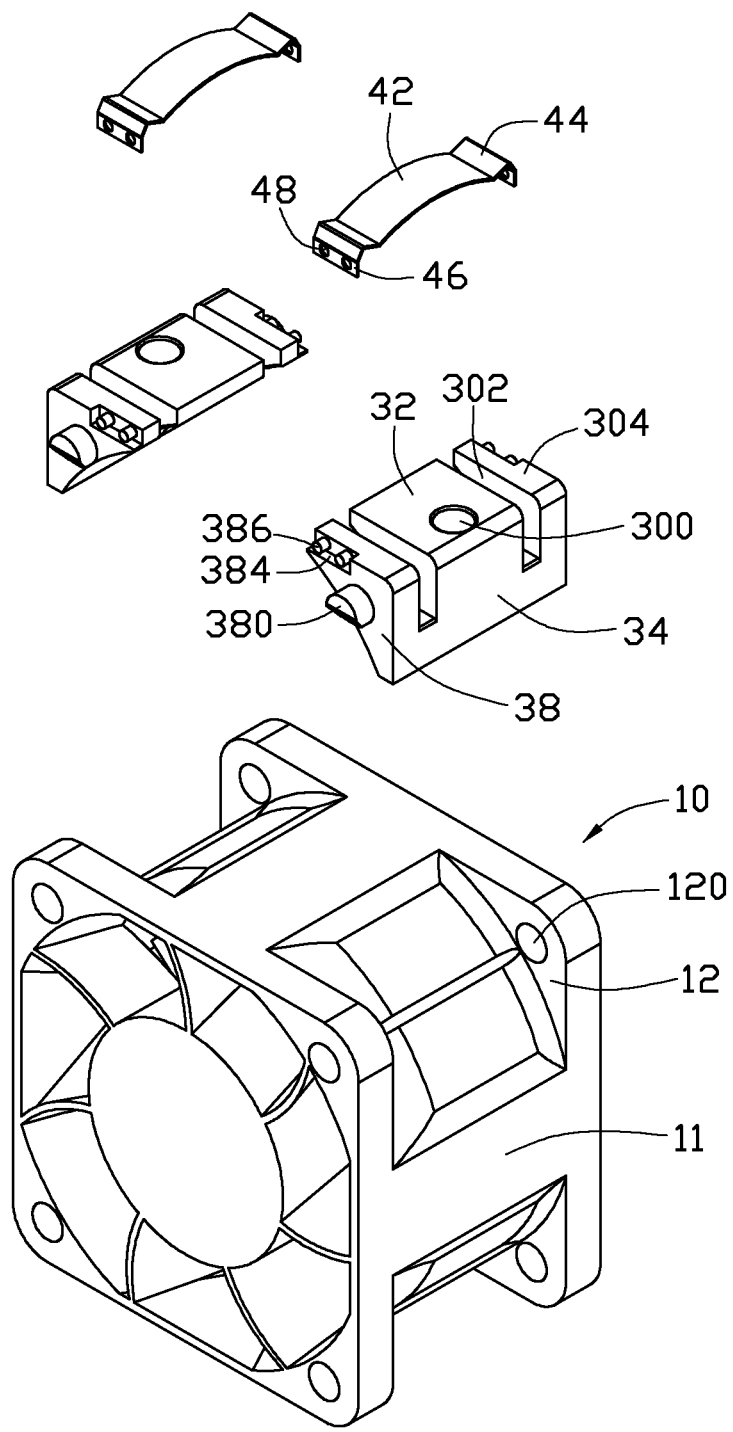
FIG. 2 is an inverted view showing two of the resilient members, two of the blocks, and one of the fans of FIG. 1.

Referring to FIG. 2, each block 30 has a substantially triangular cross-section. Each block 30 includes a bottom wall 32, a sidewall 34 extending up from a first side of the bottom wall 32 in a substantially perpendicular manner, two end walls 38 extending up from opposite ends of the bottom wall 32 in a substantially perpendicular manner, and a concave surface 36 connected between a top side of the sidewall 34 and a second side of the bottom wall 32 opposite to the first side. The concave surface 36 is also connected between the end walls 38. A protrusion 380 extends out from each of the end walls 38. A guiding surface 382 slantingly extends from a top of each protrusion 380 toward a distal end of the protrusion 380. A fixing hole 300 is defined in the block 30, and extends through the bottom wall 32 and an upper portion of the concave surface 36. Two slots 302 are defined in the block 30, at opposite sides of the fixing hole 300. Each slot 302 extends through the bottom wall 32, the sidewall 34, and a lower portion of the concave surface 36. Therefore, the block 30 has two deformable cantilevers 304 divided by the slots 302 and formed at opposite ends of the block 30. A junction of each end wall 38 and the bottom wall 32 defines a cutout 384, adjacent to the concave surface 36. Two pins 386 extend out from an inner surface of each cutout 384 perpendicular to the sidewall 38.

Each resilient member 40 includes an arc-shaped main piece 42, two substantially V-shaped connecting pieces 44 each extending from opposite ends of the main piece 42, and two fixing pieces 46 respectively extending up from distal ends of the connecting pieces 44. Each fixing piece 46 defines two through holes 48.

Figure 3:
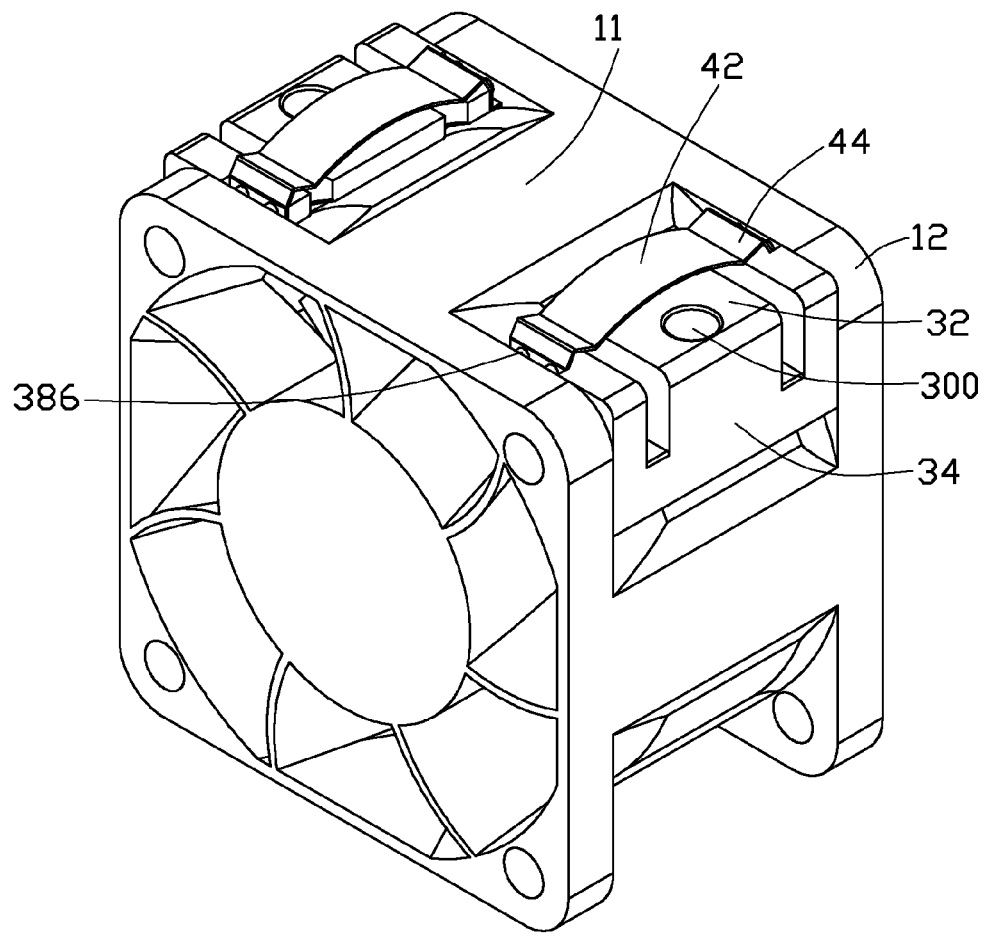
FIG. 3 is an assembled, isometric view of FIG. 2.

Referring to FIG. 3, in assembling each resilient member 40 to a corresponding one of the blocks 30, the pins 386 of the block 30 are engaged in the through holes 48 of the resilient member 40, respectively, thereby, fixing the resilient member 40 to the bottom wall 32 of the block 30.

Figure 4:
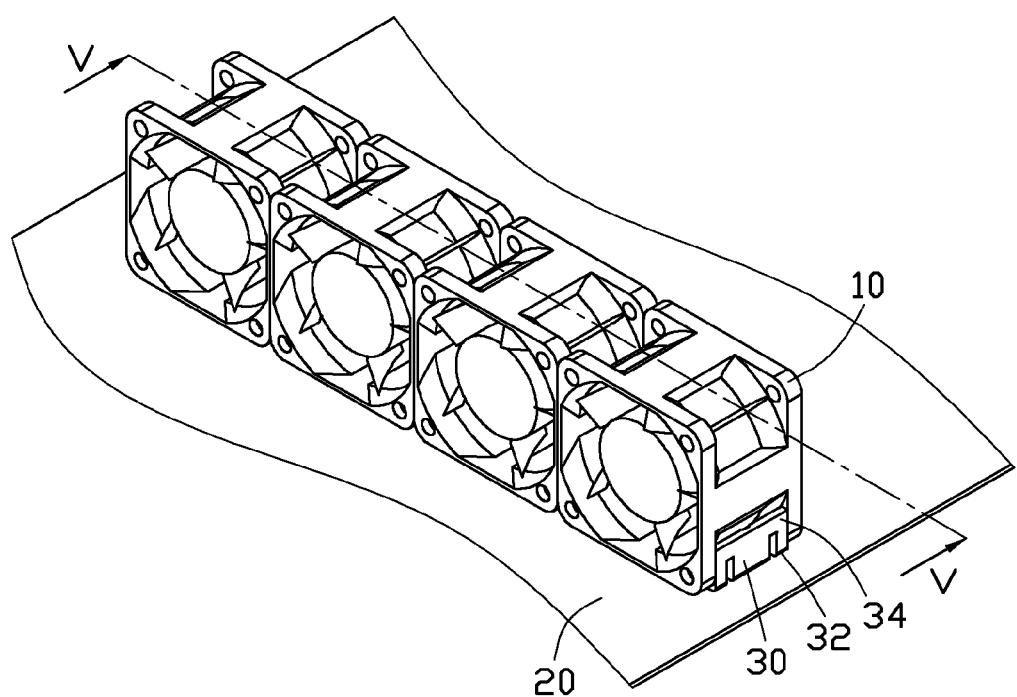
FIG. 4 is an assembled, isometric view of FIG. 1.
Figure 5:
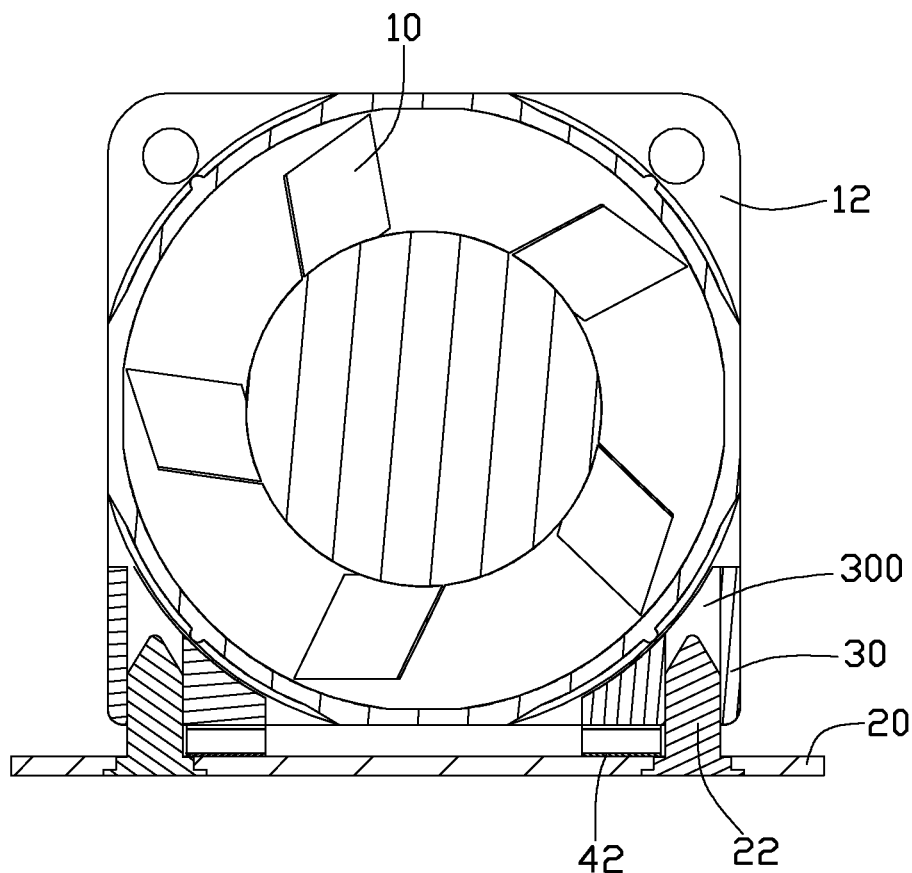
FIG. 5 is a partially sectional view of FIG. 4, taken along the line of V-V.

Referring to FIGS. 4 and 5, in mounting each fan 10 to the base board 20, two blocks 30 are aligned with and moved toward the corresponding depressed portions 110 of the fan 10. The guiding surfaces 382 abut against bottoms of the corresponding boards 12 to deform the cantilevers 304 toward each other. The distal end surfaces of the protrusions 380 slidably abut against inner surfaces of the corresponding boards 12, until the protrusions 380 align with the corresponding corner holes 120. The cantilevers 304 are restored to bias the protrusions 380 to engage in the corresponding corner holes 120. Therefore, the blocks 30 are received in the corresponding depressed portions 110, and are sandwiched between the boards 12. The concave surfaces 36 are contacted with the bottom walls of the corresponding depressed portions 110.

The fixing holes 300 fit about the corresponding rods 22; thereby the fan 10 is spaced from and fixed to the base board 20. The resilient members 40 are deformedly contacted the base board 20 to absorb vibration generated by the fan 10. A top of the fan 10 is blocked by a top board of the electronic device.

In uninstalling one of the fans 10, the fan 10 is moved away from the base board 20 to disengage the rods 22 from the corresponding fixing holes 300. The cantilevers 304 of each block 30 are deformed toward each other, to disengage the protrusions 380 from the corresponding corner holes 120. Therefore, the block 30 can be easily removed from the fan 10.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A mounting device for mounting a fan having a main body and two opposite boards connected to opposite ends of the main body, comprising:
a base board forming two rods;
two blocks to be mounted to opposite sides of a bottom of the main body of the fan; each block comprising a bottom wall defining a fixing hole to be fitted about one of the rods; and
two resilient members each mounted to a bottom of a corresponding one of the blocks and deformedly sandwiched between the base board and the corresponding block, each resilient member comprising an arc-shaped main piece, and two fixing pieces formed at opposite ends of the main piece to be fixed to opposite ends of the corresponding block.

2. The mounting device of claim 1, wherein each block is to be sandwiched between the boards of the fan and comprises two opposite end walls extending up from opposite ends of the bottom wall, two protrusions extend out from the end walls of each block to be engaged in the corresponding boards of the fan.

3. The mounting device of claim 2, wherein a guiding surface slantingly extends down from a top of each protrusion toward a distal end of the protrusion.

4. The mounting device of claim 2, wherein each block has a substantially triangular cross-section, and further comprises a sidewall perpendicularly extending up from a first side of the bottom wall, and a concave surface connected between a top side of the sidewall and a second side of the bottom wall opposite to the first side, each concave surface contacts the main body of the fan, the fixing hole of each block extends through the bottom wall and the concave surface.

5. The mounting device of claim 4, wherein two slots are defined in each block at opposite sides of the fixing hole, each slot extends through the bottom wall, a lower portion of the concave surface, and the sidewall, thereby, the block forming two deformable cantilevers at opposite ends and divided by the slots.

6. The mounting device of claim 5, wherein each end wall defines a cutout, a pin extends from an inner wall of the cutout perpendicular to the end wall, adjacent to a corresponding one of the cantilevers, to be engaged in a corresponding one of the fixing pieces of the corresponding resilient member.

7. The mounting device of claim 1, wherein each resilient member further comprises two substantially V-shaped connecting piece each connected between the main piece and one of the fixing pieces.

8. The mounting device of claim 7, wherein each fixing piece of each resilient member defines a through hole, a pin extends from each of opposite ends of each block to engage in one of through holes of the corresponding resilient member.

9. An assembly, comprising:
a base board forming two rods;
a fan comprising a main body and two boards perpendicularly connected to opposite ends of the main body;
two blocks mounted to opposite sides of a bottom of the main body of the fan; each block comprising a bottom wall defining a fixing hole fitted about one of the rods; and
two resilient members each mounted to a bottom of one of the blocks and deformedly sandwiched between the base board and the corresponding block, each resilient member comprising an arc-shaped main piece, and two fixing pieces formed at opposite ends of the main piece to be fixed to opposite ends of the corresponding block.

10. The assembly of claim 9, wherein each block is sandwiched between the boards and comprises two opposite end walls extending up from opposite ends of the bottom wall, two protrusions extend out from the end walls of each block to be engaged in the corresponding boards of the fan.

11. The assembly of claim 10, wherein a guiding surface slantingly extends down from a top of each protrusion toward a distal end of the protrusion.

12. The assembly of claim 10, wherein each block has a substantially triangular cross-section, and further comprises a sidewall perpendicularly extending up from a first side of the bottom wall, and a concave surface connected between a top side of the sidewall and a second side of the bottom wall opposite to the first side, each concave surface contacts the main body of the fan, the fixing hole of each block extends through the bottom wall and the concave surface.

13. The assembly of claim 12, wherein two slots are defined in each block at opposite sides of the fixing hole, each slot extends through the bottom wall, a lower portion of the concave surface, and the sidewall, thereby, the block forming two deformable cantilevers at opposite ends and divided by the slots.

14. The assembly of claim 13, wherein each end wall defines a cutout, a pin extends from an inner wall of the cutout perpendicular to the end wall, adjacent to a corresponding one of the cantilevers to be engaged in a corresponding one of the fixing pieces of the corresponding resilient member.

15. The assembly of claim 9, wherein each resilient member further comprises two substantially V-shaped connecting pieces each connected between the main piece and one of the fixing pieces.

16. The assembly of claim 15, wherein each fixing piece of each resilient member defines a through hole, a pin extends from each of opposite ends of each block to engage in one of through holes of the corresponding resilient member.

* * * * *